(12) United States Patent
Goi et al.

(10) Patent No.: US 6,312,358 B1
(45) Date of Patent: Nov. 6, 2001

(54) CONSTANT SPEED DRIVE APPARATUS FOR AIRCRAFT GENERATOR AND TRACTION SPEED CHANGE APPARATUS

(75) Inventors: Tatsuhiko Goi; Kouji Kawakami; Eiichi Yamakawa, all of Kakamigahara (JP)

(73) Assignee: Advanced Technology Institute of Commuter-Helicopter, Ltd., Gifu (JP)

(*) Notice: Subject to any disclaimer, the term of this patent is extended or adjusted under 35 U.S.C. 154(b) by 0 days.

(21) Appl. No.: 09/583,167

(22) Filed: May 30, 2000

Related U.S. Application Data

(62) Division of application No. 09/316,132, filed on May 21, 1999.

(51) Int. Cl.⁷ .................................................. B60K 41/14
(52) U.S. Cl. .................... 477/37; 476/4; 476/11; 476/43
(58) Field of Search ................. 477/37, 42; 475/208, 475/214, 216; 476/4, 11, 43, 41

(56) References Cited

U.S. PATENT DOCUMENTS

| | | | |
|---|---|---|---|
| 638,965 | * 12/1899 | Hoffman | 476/44 |
| 1,774,175 | * 8/1930 | Erban | 476/41 X |
| 2,123,007 | * 7/1938 | Hayes | 476/41 |
| 2,325,502 | * 7/1943 | Georges | 476/41 |
| 3,455,177 | * 7/1969 | Schofield | 476/41 |
| 3,727,474 | * 4/1973 | Fullerton | 475/208 X |
| 3,826,148 | 7/1974 | Magill . | |
| 4,086,820 | * 5/1978 | Kraus et al. | 476/2 |
| 4,382,188 | 5/1983 | Cronin . | |
| 4,572,016 | * 2/1986 | Okoshi | 476/43 X |
| 4,587,866 | 5/1986 | Kraus . | |
| 5,372,555 | 12/1994 | Hibi . | |
| 5,820,510 | 10/1998 | Ueda . | |

FOREIGN PATENT DOCUMENTS

| | | |
|---|---|---|
| 828 377 | 1/1952 | (DE) . |
| 580 022 | 10/1994 | (FR) . |
| 46-24753 | 8/1971 | (JP) . |
| 51-17770 | 2/1976 | (JP) . |
| 2-157483 | 6/1990 | (JP) . |
| 3-223555 | 10/1991 | (JP) . |
| 6-288455 | 10/1994 | (JP) . |
| 7-139600 | 5/1995 | (JP) . |

* cited by examiner

Primary Examiner—Charles A Marmor
Assistant Examiner—Ha Ho
(74) Attorney, Agent, or Firm—Wenderoth, Lind & Ponack, L.L.P.

(57) ABSTRACT

A constant speed drive apparatus for an aircraft generator comprises an input shaft for receiving drive torque from an aircraft engine, a traction speed change mechanism of continuously-variable speed change ratio which is coupled to the input shaft, an output shaft for supplying the aircraft generator with drive torque which is changed in speed by the traction speed change mechanism, and a control computer for controlling the speed change ratio of the traction speed change mechanism to maintain the output shaft at a predetermined rotational frequency. With such constitution it is possible to achieve a small and lightweight constant speed drive apparatus having a high transmission efficiency.

9 Claims, 7 Drawing Sheets

CONSTANT SPEED DRIVE APPARATUS FOR AIRCRAFT GENERATOR AND TRACTION SPEED CHANGE APPARATUS

This is a Divisional Application of application Ser. No. 09/316,132, Filed May 21, 1999.

BACKGROUND OF THE INVENTION

1. Field of the Invention

The present invention relates to a constant speed drive apparatus for an airborne generator which drives an airborne generator with engine torque, and to an aircraft power generating apparatus including the generator. Furthermore, the invention relates to a traction speed change apparatus of continuously-variable speed change ratio.

2. Description of the Related Art

An aircraft has generators mounted thereon for supplying electric power to electrical equipment including instruments, communication devices, lighting, air-conditioners and anti-icing heaters. Each engine of a large passenger airplane, e.g., a twin-engined jetliner, is mounted with a large generator of the order of 100 kVA. The engine has an accessory drive shaft for dividing out turbine torque to drive various devices such as a hydraulic pump. This accessory drive shaft serves as a drive source of the generator.

The engine speed of an aircraft varies widely from idling conditions at the time of landing to acceleration conditions at the time of takeoff, and generally varies continuously over the range of 5,000 rpm to 10,000 rpm. On the other hand, an AC output of 400 Hz±7 Hz is specified for generators, and the drive shaft of the generator is required to rotate constantly at a rate of 12,000 rpm or 24,000 rpm. Thus, in the case where engine output is directly connected to the generator through an accelerating gear or the like, some compensation system is needed since otherwise the rotational frequency of the generator varies to excess.

The following compensation systems have been in wide use heretofore: 1) mechanical type: a hydromechanical CSD (Constant Speed Drive) having a stepless speed change mechanism with a combination of a hydraulic pump, a hydraulic motor and a differential gear, disposed between the accessory drive shaft and a generator to absorb variations in the engine speed and drive the generator at constant speed, and 2) electrical type: a VSCF (Variable Speed Constant Frequency) having a semiconductor device for switching generator output with frequency variations to convert the output into an AC output of fixed frequency.

The former, mechanical type requires a large number of components and a complicated mechanism. This type can achieve only a low transmission efficiency of about 65% due to losses in conversion to hydraulic pressure and the like, and is expensive at that.

The latter, electrical type, though increasingly used at present, becomes heated to a very high degree since it controls a large amount of electric power. Thus, a large cooling mechanism is required, whereby this type is heavier as a whole than the mechanical type. Moreover, since the semiconductor device is less reliable than the mechanical type, the mechanical type remains the preferred option in the case where priority is given to safety and weight reduction.

SUMMARY OF THE INVENTION

An object of the present invention is to provide a constant speed drive apparatus for an aircraft generator and a power generating apparatus for aircraft which are small and lightweight and yet achieve high transmission efficiency.

Another object of the invention is to provide a small and lightweight traction speed change apparatus capable of achieving a high transmission efficiency.

The present invention provides a constant speed drive apparatus for an aircraft generator, in which the apparatus comprise an input shaft for receiving drive torque from an aircraft engine; a traction speed change mechanism having a continuously-variable speed change ratio, and which is coupled to the input shaft; an output shaft for supplying the aircraft generator with drive torque which is changed in speed by the traction speed change mechanism; and a rotational-frequency controlling mechanism for controlling the speed change ratio of the traction speed change mechanism so as to maintain the output shaft at a predetermined rotational frequency.

The traction speed change mechanism includes an input disk interlocked to the input shaft; an output disk interlocked to the output shaft; transmission rollers disposed between the input disk and the output disk; yoke members for supporting the transmission rollers so that they are pivotable about an axis perpendicular to an axis of rotation of each of the transmission rollers and the input disk; and an actuator for pulling the yoke members along the axis of rotation of the input disk and drawing the transmission rollers toward the input disk to generate a pressing force of the transmission rollers.

According to the invention, the traction speed change mechanism of continuously-variable speed change ratio is disposed between the input shaft and the output shaft, whereby a relationship between the rotational frequency of the output shaft and the rotational frequency of the input shaft can be continuously controlled. Further, the rotational-frequency controlling means is provided for controlling the speed change ratio of the traction speed change mechanism to perform a feedback operation for maintaining the output shaft at a constant rotational frequency, thereby to eliminate inconveniences due to variations in rotational frequency of the input shaft. Thus, even when the rotational frequency of the aircraft engine varies over a wide range, the aircraft generator may be driven with a constant rotational frequency. A mechanical feedback control or an electrical feedback control are applicable as the rotational-frequency controlling means. In the former the rotational motion of the output shaft is taken out for use as an input for controlling the traction speed change mechanism, and in the latter the rotational frequency of the output shaft is converted into an electrical signal once for use as an input for controlling the traction speed change mechanism.

In connection with the traction speed change mechanism, according to the invention, the mechanism for generating the pressing force of the transmission rollers may be provided separately from the axis of rotation of the disks. Moreover, the actuator is operable to draw the transmission rollers directly through the yoke members, which allows the pressing force of the rollers to be controlled easily and with high precision.

In a conventional traction speed change mechanism, an axial force generating mechanism adjacent an input disk generates an axial force, to control the pressing force of rollers indirectly through the input disk. Such a mechanism is complicated. Where the axial force generating mechanism has cam rollers disposed on two opposed cam surfaces to generate an axial force corresponding to a torque difference between the cam surfaces, a slight hysteresis property occurs between the torque difference and the axial force, which is due to rolling friction and the like of the cam rollers. Further, at the time of high-speed rotation, a strong centrifugal force acts on the cam rollers to increase friction at supports of the cam rollers, which could obstruct rolling thereof. When a counter torque acts to produce a negative torque difference on the cam surfaces, the transmission rollers move away from the input disk. To avoid such a situation, some bias axial force mechanism is provided. On the other hand, the above measure peculiar to the cam rollers can be eliminated by employing the construction in which the actuator directly drives the transmission rollers.

The traction speed change mechanism may be in the form of a half toroidal CVT (Continuously Variable Transmission) or a full toroidal CVT, which is a small, lightweight and yet low loss speed change mechanism. With such a traction speed change mechanism coupled to a transmission line rotating at high speed, e.g. engine output, a maximum permissible torque can be small, contributing to a reduction in size and weight of the entire apparatus.

The invention also provides a constant speed drive apparatus for an aircraft generator, in which the apparatus comprises an input shaft for receiving drive torque from an aircraft engine; a traction speed change mechanism of continuously-variable speed change ratio, and which is coupled to the input shaft; an output shaft for supplying the aircraft generator with drive torque which is changed in speed by the traction speed change mechanism; and rotational-frequency controlling mechanism for controlling the speed change ratio of the traction speed change mechanism so as to maintain the output shaft at a predetermined rotational frequency.

The traction speed change mechanism includes an input disk interlocked to the input shaft; an output disk interlocked to the output shaft; transmission rollers disposed between the input disk and the output disk; and a pressing force generating mechanism for generating a pressing force acting in a direction of an axis of rotation of each of the transmission rollers therefrom to the input disk and the output disk.

According to the invention, the traction speed change mechanism of continuously-variable speed change ratio is disposed between the input shaft and the output shaft, whereby a relationship between the rotational frequency of the output shaft and the rotational frequency of the input shaft can be continuously controlled. Further, the rotational-frequency controlling means is provided for controlling the speed change ratio of the traction speed change mechanism to perform a feedback operation for maintaining the output shaft at a constant rotational frequency, thereby to eliminate inconvenience due to variations in rotational frequency of the input shaft. Thus, even when the rotational frequency of the aircraft engine varies over a wide range, the aircraft generator may be driven with a constant rotational frequency. A mechanical feedback control or an electrical feedback control are applicable as the rotational-frequency controlling mechanism. In the former the rotational motion of the output shaft is taken out for use as an input for controlling the traction speed change mechanism, and in the latter rotational frequency of the output shaft is converted into an electrical signal once for use as an input for controlling the traction speed change mechanism.

In connection with the traction speed change mechanism, according to the invention, since by providing the pressing force generating mechanism for generating a pressing force acting in the direction of the axis of rotation of each of the transmission rollers, a constant angle α is formed between the direction of the pressing force and a tangential direction on the surface of contact of each disk despite variations in the tilt angle of the transmission rollers, an effective pressing force acting normal to the surface of contact also is maintained constant. Even when the speed change ratio of the traction speed change mechanism greatly varies to acceleration or deceleration, the effective pressing force acts steadily to assure torque transmission between the transmission rollers and each disk. Further, the transmission roller and each disk may be shaped to provide a small angle α to produce a wedging effect. A strong effective pressing force may thereby be generated from a small pressing force, to achieve a reduction in size and weight of the pressing force generating mechanism.

The invention further provides a constant speed drive apparatus for an aircraft generator, in which the apparatus comprises an input shaft for receiving drive torque from an aircraft engine; a traction speed change mechanism of continuously-variable speed change ratio, and which is coupled to the input shaft; an output shaft for supplying the aircraft generator with drive torque which is changed in speed by the traction speed change mechanism, and which is directly coupled to a drive shaft of the aircraft generator, and a rotational-frequency controlling mechanism for controlling the speed change ratio of the traction speed change mechanism so as to maintain the output shaft at a predetermined rotational frequency.

The traction speed change mechanism of a single cavity type includes an input disk interlocked to the input shaft; an output disk having an outer diameter smaller than that of the input disk, and which is interlocked to the output shaft; and transmission rollers disposed between the input disk and the output disk. The aircraft generator is driven in a state in which the traction speed change mechanism is accelerated up to a speed higher than a rotational frequency of the input shaft.

According to the invention, the traction speed change mechanism of continuously-variable speed change ratio is disposed between the input shaft and the output shaft, whereby a relationship between the rotational frequency of the output shaft and the rotational frequency of the input shaft can be continuously controlled. Further, the rotational-frequency controlling mechanism is provided for controlling the speed change ratio of the traction speed change mechanism to perform a feedback operation for maintaining the output shaft at a constant rotational frequency, thereby to eliminate inconveniences due to variations in rotational frequency of the input shaft. Thus, even when the rotational frequency of the aircraft engine varies over a wide range, the aircraft generator may be driven with a constant rotational frequency. A mechanical feedback control or an electrical feedback control are applicable as the rotational-frequency controlling mechanism. In the former the rotational motion of the output shaft is taken out for use as an input for controlling the traction speed change mechanism, and in the latter the rotational frequency of the output shaft is converted into an electrical signal once for use as an input for controlling the traction speed change mechanism.

In general, the traction speed change mechanisms are roughly classified into a double cavity type and a single cavity type. In comparison with the former, the latter can be constructed of only one set of an input disk, an output disk, transmission rollers etc., and the drive torque of the aircraft generator is relatively small. Accordingly, the single cavity type, which is simple, small and lightweight, is preferable for airborne use.

Moreover, according to the invention the disks have asymmetrical shapes such that the output disk has an outer diameter smaller than that of the input disk. Thus, the output disk is reduced in size. In an ordinary traction speed change mechanism, the disks have the same shape and are arranged symmetically to effect deceleration, equal speed drive and acceleration. In the present invention, the speed change is limited to acceleration to drive an aircraft generator. Consequently, the output side always has a smaller radius of contact than the input side with respect to the radius of contact between the disks and transmission rollers. The output disk may be reduced in size and weight by cutting off unused parts, which contributes to a reduction in size and weight of the entire apparatus.

In the present invention, it is preferable that the rotational-frequency controlling mechanism includes a rotational-frequency detecting mechanism for detecting a rotational frequency of the output shaft; and a control circuit for controlling the speed change ratio of the traction speed change mechanism based on a detection signal received from the rotational-frequency detecting mechanism.

According to the invention, the rotational-frequency detecting mechanism detects a rotational frequency of the output shaft, and the control circuit controls the speed change ratio of the traction speed change mechanism, whereby the rotational frequency of the output shaft maybe stabilized with ease. By using such electrical feedback control, a transfer function may be adjusted easily to control the rotational frequency of the aircraft generator with high precision.

In the invention, it is preferable that the engine status values indicating an operating status of the aircraft engine are inputted to the control circuit, and variations in the rotational frequency of the input shaft are estimated on the basis of the engine status values to stabilize the rotational frequency of the output shaft.

According to the invention, the engine status values such as a throttle control amount and a fuel flow rate are inputted to the control circuit, whereby the control circuit may determine beforehand what factor varies engine speed. Thus, variations in the engine speed can be estimated to a certain degree, before the variations actually occur, to set an optimal transfer function. The rotational frequency of the aircraft generator may be controlled with higher precision.

The present invention also provides a power generating apparatus for an aircraft, and the apparatus comprises the constant speed drive apparatus and a generator driven by the output shaft to generate electric power.

According to the invention, the traction speed change mechanism having a continuously-variable speed change ratio is disposed between the input shaft and output shaft, whereby a relationship between the rotational frequency of the output shaft and the rotational frequency of the input shaft is continuously controllable. Further, rotational-frequency controlling mechanism is provided for controlling the speed change ratio of the traction speed change mechanism to perform a feedback operation for maintaining the output shaft at a constant rotational frequency, thereby to eliminate inconveniences due to variations in the rotational frequency of the input shaft. Thus, even when the rotational frequency of the aircraft engine varies over a wide range, the aircraft generator may be driven with a constant rotational frequency.

The invention further provides a traction speed change apparatus comprising an input disk interlocked to the input shaft; an output disk interlocked to the output shaft; transmission rollers disposed between the input disk and the output disk; yoke members for supporting the transmission rollers so that they are pivotable about an axis perpendicular to an axis of rotation of each of the transmission rollers and the input disk; and an actuator for pulling the yoke members along the axis of rotation of the input disk and drawing the transmission rollers toward the input disk to generate a pressing force of the transmission rollers According to the invention, the mechanism for generating the pressing force of the transmission rollers may be provided separately from the axis of rotation of the disks. Moreover, the actuator is operable to draw the transmission rollers directly through the yoke members, which allows the pressing force of the rollers to be controlled easily and with high precision.

In a conventional ordinary traction speed change mechanism, an axial force generating mechanism adjacent an input disk generates an axial force, to control the pressing force of rollers indirectly through the input disk. Such a mechanism is complicated. Where the axial force generating mechanism has cam rollers disposed on two opposed cam surfaces to generate an axial force corresponding to a torque difference between the cam surfaces, a slight hysteresis property occurs between the torque difference and the axial force, which is due to rolling friction and the like of the cam rollers. Further, in time of high-speed rotation, a strong centrifugal force acts on the cam rollers to increase friction at supports of the cam rollers, which could obstruct rolling thereof. When a counter torque acts to produce a negative torque difference on the cam surfaces, the transmission rollers move away from the input disk. To avoid such a situation, some bias axial force mechanism is provided. On the other hand, the above measure peculiar to the cam rollers is made unnecessary by employing the construction in which the actuator directly drives the transmission rollers.

The invention further provides a traction speed change apparatus comprising an input disk interlocked to the input shaft; an output disk interlocked to the output shaft; transmission rollers disposed between the input disk and the output disk; and a pressing force generating mechanism for generating a pressing force acting in a direction of an axis of rotation of each of the transmission rollers therefrom to the input disk and the output disk.

According to the invention, with the pressing force generating mechanism provided for generating a pressing force acting in the directions of axes of rotation of the transmission rollers, a constant angle α is formed between the direction of the pressing force and a tangential direction on the surface of contact of each disk despite variations in the tilt angle of the transmission rollers. Thus, an effective pressing force acting normal to the surface of contact also is maintained constant. Even when the speed change ratio of the traction speed change mechanism greatly varies to acceleration or deceleration, the effective pressing force acts steadily to assure torque transmission between the transmission rollers and each disk. Further, the transmission roller and each disk may be shaped to provide a small angle α to produce a wedging effect. A strong effective pressing force may thereby be generated from a small pressing force, to achieve a reduction in size and weight of the pressing force generating mechanism.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
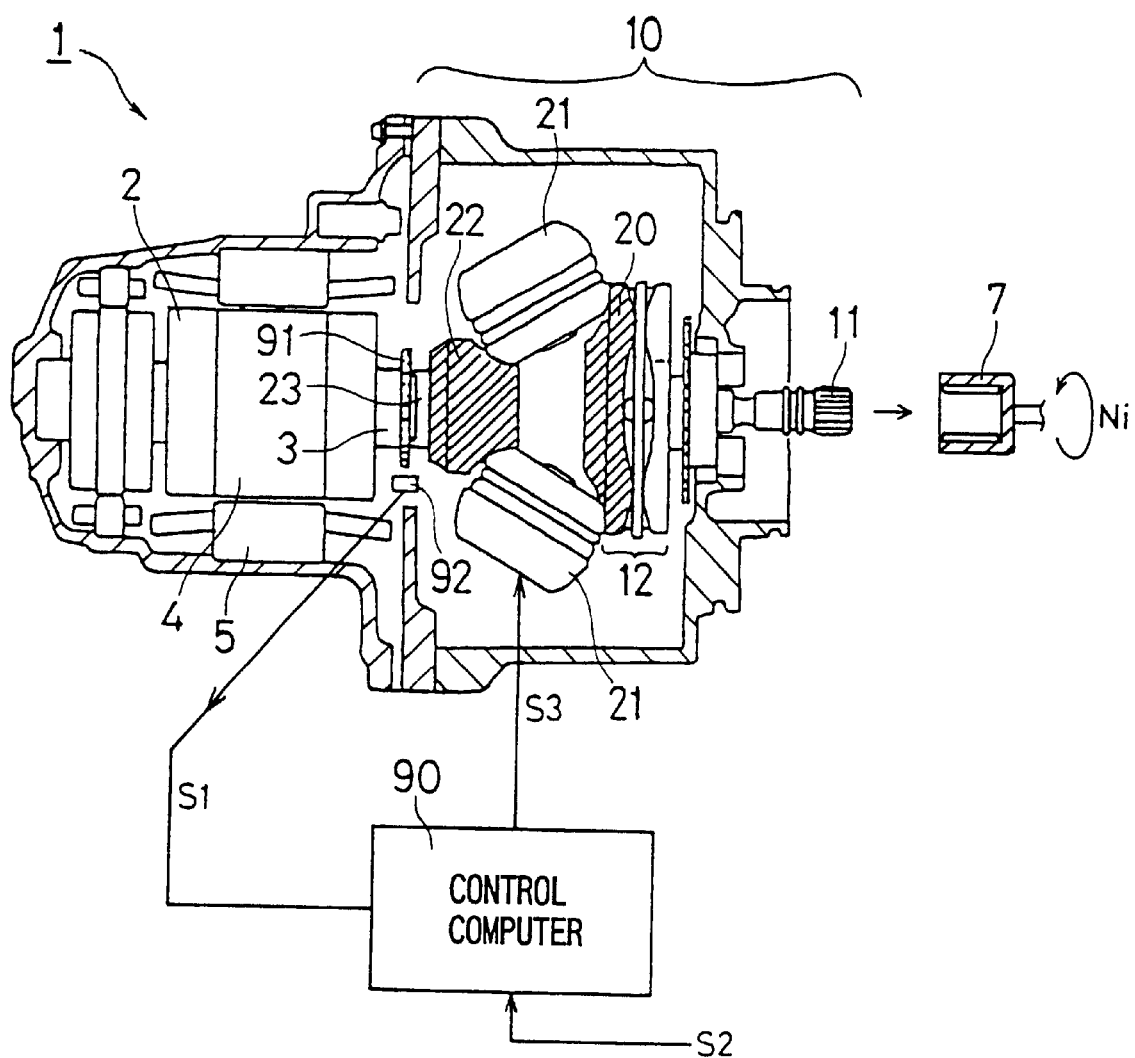
FIG. 1 is a view showing one example of power generating apparatus for an aircraft according to the present invention.

Now referring to the drawings, preferred embodiments of the invention are described below.

FIG. 1 is a view showing one example of a power generating apparatus for an aircraft according to the present invention. The power generating apparatus 1 includes an airborne generator 2, and a constant speed drive apparatus 10 for transmitting drive torque from an aircraft engine to the generator 2 and maintaining a rotational frequency of the generator 2 constant.

The generator 2 has a drive shaft 3 coupled to an output shaft 23 of a constant speed drive apparatus 10, a rotor 4 rotatable with the drive shaft 3, and a stator 5 disposed around and close to the rotor 4. In the case where the rotor 4 rotates at a rate of 24,00 rpm, an alternating electric current of 400 Hz is generated in a coil of stator 5.

The constant speed drive apparatus 10 has an input shaft 11 coupled to an accessory drive shaft 7 of the aircraft engine, the output shaft 23 coupled to the drive shaft 3 of generator 2, and a traction speed change mechanism of continuously-variable speed change ratio, disposed between the input shaft 11 and output shaft 23. The accessory drive shaft 7 is in the form of a female spline shaft, while the input shaft 11 is in the form of a male spline shaft. The two shafts 7 and 11 are separably and axially displaceably coupled to transmit only torque from one to the other. The output shaft 23 also is coupled to the drive shaft 3 of generator 2 through splines.

The traction speed change mechanism has an input disk 20 rotatable with the input shaft 11, an output disk 22 rotatable with the output shaft 23, transmission rollers 21 disposed between the input disk 20 and output disk 22, and an axial pressing force generating mechanism 12 for applying a pressing force to the transmission rollers 21. The transmission rollers 21 are supported on support members called trunnions so that they are rotatable about roller axes and tiltable in a plane including the roller axes and an axis of rotation of disks 20 and 22.

A relationship of speed change ratio No/Ni=Ri/Ro is established, where Ri is a radius of contact at the input which is a distance of positions of contact between the transmission rollers 21 and input disk 20 from the axis of rotation of disks 20 and 22, Ro is a radius of contact at the output which is a distance of positions of contact between the transmission rollers 21 and output disk 22 from the axis of rotation of disks 20 and 22, Ni is a rotational frequency of the input shaft 11 and input disk 20, and No is a rotational frequency of the output shaft 23 and output disk 22. Then, by controlling a tilt angle of transmission rollers 21, the radii of contact Ri and Ro may be varied continuously to vary the speed change ratio No/Ni continuously.

In order to maintain the rotational frequency of generator 2 at 24,000 rpm, the speed change ratio No/Ni must be decreased in proportion to any increase in the rotational frequency of accessory drive shaft 7, and increased in proportion to any decrease. Where, for example, the rotational frequency of the aircraft engine varies in the range of 4,800 rpm to 9,600 rpm, the speed change ratio No/Ni is controlled in the range of 5 to 2.5. Since the rotational frequency of generator 2 is higher than that of the aircraft engine at all times, the traction speed change mechanism constantly operates in an accelerating mode.

Since the radius ratio Ri/Ro also varies within the range of 2.5 to 5, the disks 20 and 22 will serve the purpose as long as roller-contacting surfaces thereof can cope with this range. Thus, the output disk 22 may have an outer diameter smaller than that of the input disk 20, and the two disks 20 and 22 may be shaped asymmetrical. In this way, the output disk 22 may be reduced in size and weight to reduce the size and weight of the entire apparatus.

On the other hand, a rotational-frequency controlling mechanism for controlling the speed change ratio No/Ni includes a pulse disk 91 mounted on the output shaft 23 and having cyclic shape variations in the circumferential direction, a rotational-frequency sensor 92 for electrically, magnetically or optically detecting a rotational frequency of pulse disk 91, and a control computer 90 operable, based on a detection signal S1 from the rotational-frequency sensor 92, to output a control signal S3 determining a speed change ratio of the traction speed change mechanism. Instead of the signal from the rotational-frequency sensor 92, a frequency component of an output voltage of generator 2 may be adopted as detection signal S1 indicating a rotational frequency for use in the control.

The control computer 90 controls the rotational frequency of generator 2 with high precision through a feedback control to maintain at a predetermined value the rotational frequency No of output shaft 23 detected by the rotational-frequency sensor 92. The control computer 90 performs arithmetic processing based on a control program. A transfer function of the feedback control may be selected as desired according to individual engine characteristics and generator characteristics. These features assure a high-precision rotational-frequency control. Such a feedback control may be achieved with an analog circuit also.

Further, to realize a rotational-frequency control of still higher precision, the control computer 90 receives from a flight control computer (not shown) of the aircraft a status signal S2 indicating an operating status of the engine such as an amount of throttle control or a fuel flow rate. Since the engine has a considerably large mass, engine speed shows a relatively slow response to sharp variations in the fuel flow rate. The control circuit 90, by determining from the status signal S2 beforehand what factor varies engine speed, can estimate variations in the engine speed to a certain degree, and select an optimal transfer function for controlling the rotational frequency of generator 2 with increased precision.

The traction speed change mechanism in FIG. 1 is the single cavity type having one set of transmission rollers 21, input disk 20 and output disk 22, but one of the double cavity type is equally eligible.

Figure 2:
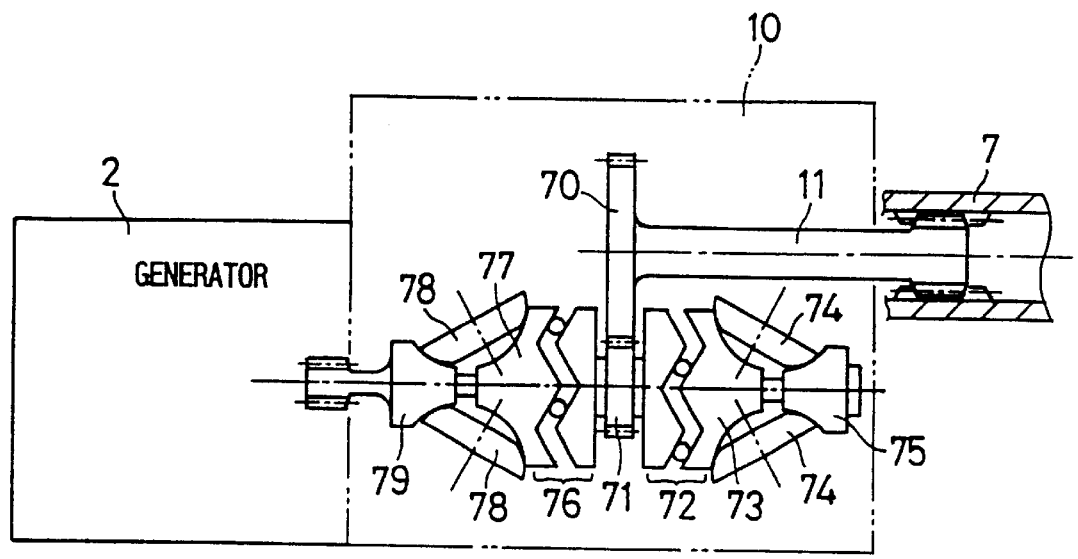
FIG. 2 is a view showing another example of power generating apparatus for an aircraft according to the invention.

FIG. 2 is a view showing another example of a power generating apparatus for an aircraft. This example employs a traction speed change mechanism of the double cavity type. The apparatus includes a first speed change mechanism having an axial pressing force generating mechanism 72, an input disk 73, transmission rollers 74 and an output disk 75, and a second speed change mechanism having an axial pressing force generating mechanism 76, an input disk 77, transmission rollers 78 and an output disk 79.

The drive torque supplied from the accessory drive shaft 7 to the input shaft 11 is divided to the first speed change mechanism and second speed change mechanism through gears 70 and 71. The transmission rollers 74 and 78 are controlled to have an identical tilt angle, so that the first speed change mechanism and second speed change mechanism have the same speed change ratio. The output disks 75 and 79 are rotatable together through a hollow shaft structure to drive the generator 2.

Figure 3:
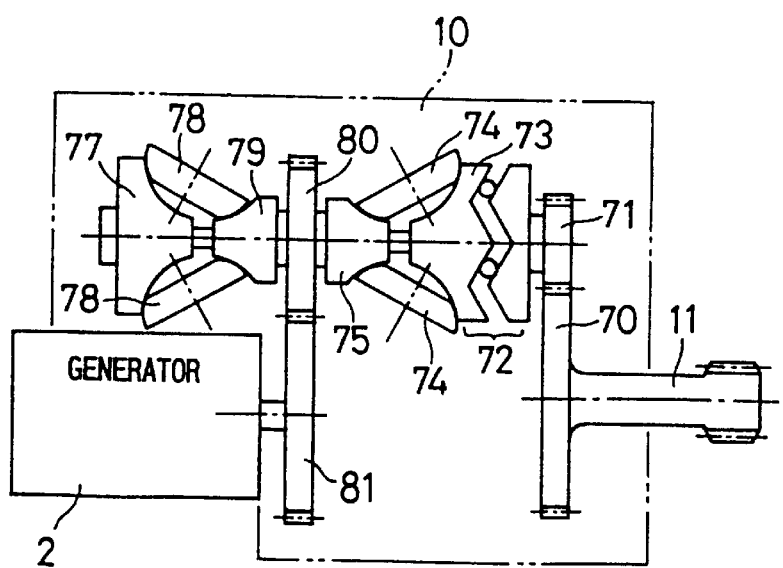
FIG. 3 is a view showing a further example of power generating apparatus for an aircraft according to the invention.

FIG. 3 is a view showing a further example of a power generating apparatus for aircraft. This example also employs a traction speed change mechanism of the double cavity type. The apparatus includes a first speed change mechanism having an axial pressing force generating mechanism 72, an input disk 73, transmission rollers 74 and an output disk 75, and a second speed change mechanism having an input disk 77, transmission rollers 78 and an output disk 79. The input disks 73 and 77 are coupled and rotatable together through a hollow shaft structure.

The drive torque supplied to the input shaft 11 is divided to the input disk 73 of the first speed change mechanism and the input disk 77 of the second speed change mechanism through gears 70 and 71. The transmission rollers 74 and 78 are controlled to have an identical tilt angle, so that the first speed change mechanism and second speed change mechanism have the same speed change ratio. The torque of output disks 75 and 79 drives the generator 2 through gears 80 and 81.

The above double cavity type has an advantage over the single cavity type in durability and service life since the transmission rollers 74 and 78 have increased areas of contact. Further, efficiency is improved since the axial force is enclosed inside. However, the single cavity type can be constructed of only one set of an input disk, an output disk, transmission rollers etc., and the drive torque of the aircraft generator is relatively small. Accordingly, the single cavity type, which is simple, small and lightweight, is preferable for airborne use.

Figure 4:
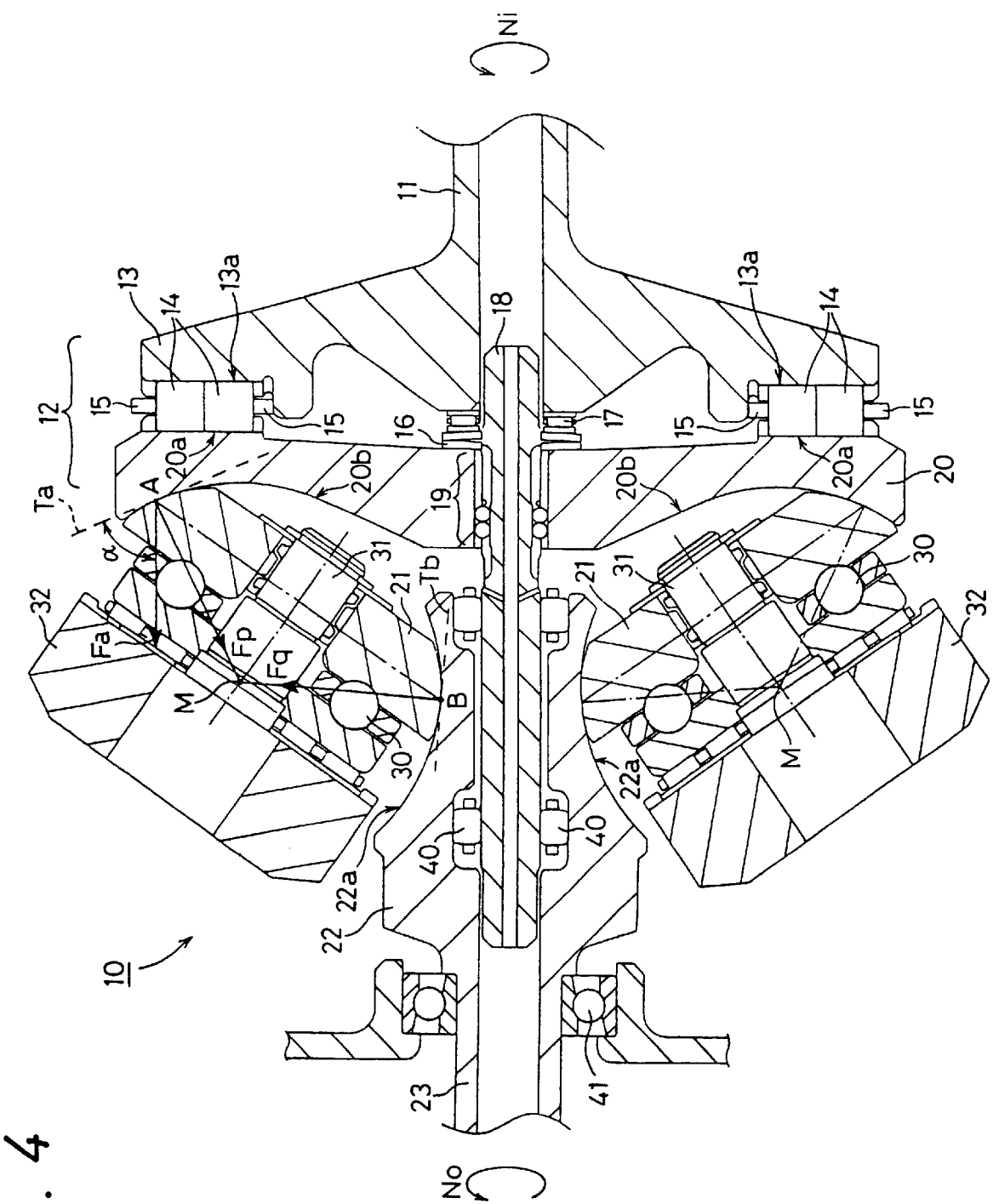
FIG. 4 is a view showing a first embodiment of constant speed drive apparatus 10.

FIG. 4 is a view showing a first embodiment of constant speed drive apparatus 10. A traction speed change mechanism will be described first. Transmission rollers 21 are disposed between an input disk 20 and an output disk 22. Contact surfaces 20b where the input disk 20 and transmission rollers 21 contact and contact surfaces 22a where the output disk 22 and transmission rollers 21 contact are in the form of toroidal surfaces. The contact between the disks 20, 22 and transmission rollers 21 is constantly maintained despite variations in the tilt angle of transmission rollers 21. The input disk 20 is supported on a penetrating shaft 18 through a spline bearing 19, so that the input disk 20 is axially displaceable.

Each transmission roller 21 is supported by a thrust bearing 30 and a radial bearing 31. Further, a trunnion 32 is provided for supporting and controlling each transmission roller 21 to be tiltable about a tilt center M. The plurality (two in FIG. 4) of transmission rollers 21 are arranged symmetrically about an axis of rotation of the disks 20 and 21. A radius of contact Ri at the input and a radius of contact Ro at the output are variable with the tilt angle of transmission rollers 21.

The output disk 22 is formed integral with an output shaft 23 for outputting torque, and rotatably supported on the penetrating shaft 18 through a radial bearing 40. Further, the output shaft 23 is supported by a housing through an angular bearing 41 to be held against axial displacement.

Where, for example, the speed change ratio No/Ni is controlled in the range of 5 to 2.5, the radius ratio Ri/Ro also varies in the range of 2.5 to 5. Consequently, the output disk 22 may have an outer diameter smaller than that of the input disk 20, and the two disks 20 and 22 may be shaped asymmetrical. In this way, the output disk 22 may be reduced in size and weight.

An axial pressing force generating mechanism 12 will be described next. The axial pressing force generating mechanism 12 disposed between the input shaft 11 and input disk 20 has a disk-shaped rotating cam 13 rotatable with the input shaft 11. A plurality of wave-like cam surfaces 13a and 20a are formed at equal intervals circumferentially on opposed surfaces of rotating cam 13 and input disk 20, respectively, to vary surface-to-surface spacing continuously. A plurality of cam rollers 14 are disposed between and in contact with the cam surfaces 13a and 20a. The cam rollers 14 lie in troughs of cam surfaces 13a and 20a in a steady state. The input shaft 11 is pressed toward the input disk 20 by a plate spring or the like (not shown), for example, so that the rotating cam 13, cam rollers 14 and input disk 20 are in close contact under a predetermined pressing force.

A retainer 15 is in the form of a disk with a plurality of rectangular retaining bores formed at equal intervals circumferentially thereof. These bores are slightly larger than the outside shape of cam rollers 14. The cam rollers 14 are fitted in these retaining bores, whereby the cam rollers 14, while being allowed to rotate, are maintained in position relative to one another.

The rotating cam 13 has a hollow center for receiving the penetrating shaft 18 to determine the center of rotation. The penetrating shaft 18 has, mounted thereon, a plate spring 16 for absorbing axial force variations, and a thrust bearing 17, which are disposed between the rotating cam 13 and input disk 20 to prevent wobbling of the rotating cam 13.

Operation of the axial pressing force generating mechanism 12 will be described next. When the rotating cam 13 and input disk 20 rotate steadily in a light load condition, the cam rollers 14 revolve with the rotating cam 13 and input disk 20 while remaining in the troughs of cam surfaces 13a and 20a.

When a positive torque is applied to the input shaft 11 subsequently, the rotating cam 13 tends to rotate ahead of the input disk 20. With a relative angular displacement between the input shaft 11 and rotating cam 13, the cam rollers 14 tend to roll in a circumferential direction up the slopes of cam surfaces 13a and 20a. This enlarges the spacing between the cam surfaces 13a and 20a, and presses the input disk 20 along the axis of rotation, thereby generating an axial force. In this way, an axial force may be generated which is substantially proportional to a torque difference between the rotating cam 13 and input disk 20.

The axial force generated by the axial force generating mechanism 12 acts as a pressing force Fa to press the transmission rollers 21 through the input disk 20. A force acting from a point of contact A between the surface 20b of input disk 20 and each transmission roller 21 toward the tilt center M serves as an effective pressing force Fp acting on the transmission roller 21. Similarly, with regard to the output disk 22, a forces acting from a point of contact B between the surface 22a and each transmission roller 21 toward the tilt center M serves as an effective pressing force Fq acting on the transmission roller 21. Each trunnion 32 supports the transmission roller 21 with a force counterbalancing the two effective pressing forces Fp and Fq.

When the transmission rollers 21 are tilted, an angle α between tangent Ta and pressing force Fa at the point of contact A varies. Thus, the effective pressing forces Fp and Fq are variable with the tilt angle. The axial force is adjusted to produce, throughout the range of tilt angle variations of transmission rollers 21, effective pressing forces Fp and Fq sufficient to prevent slippage between the disks 20, 22 and transmission rollers 21.

Figure 5:
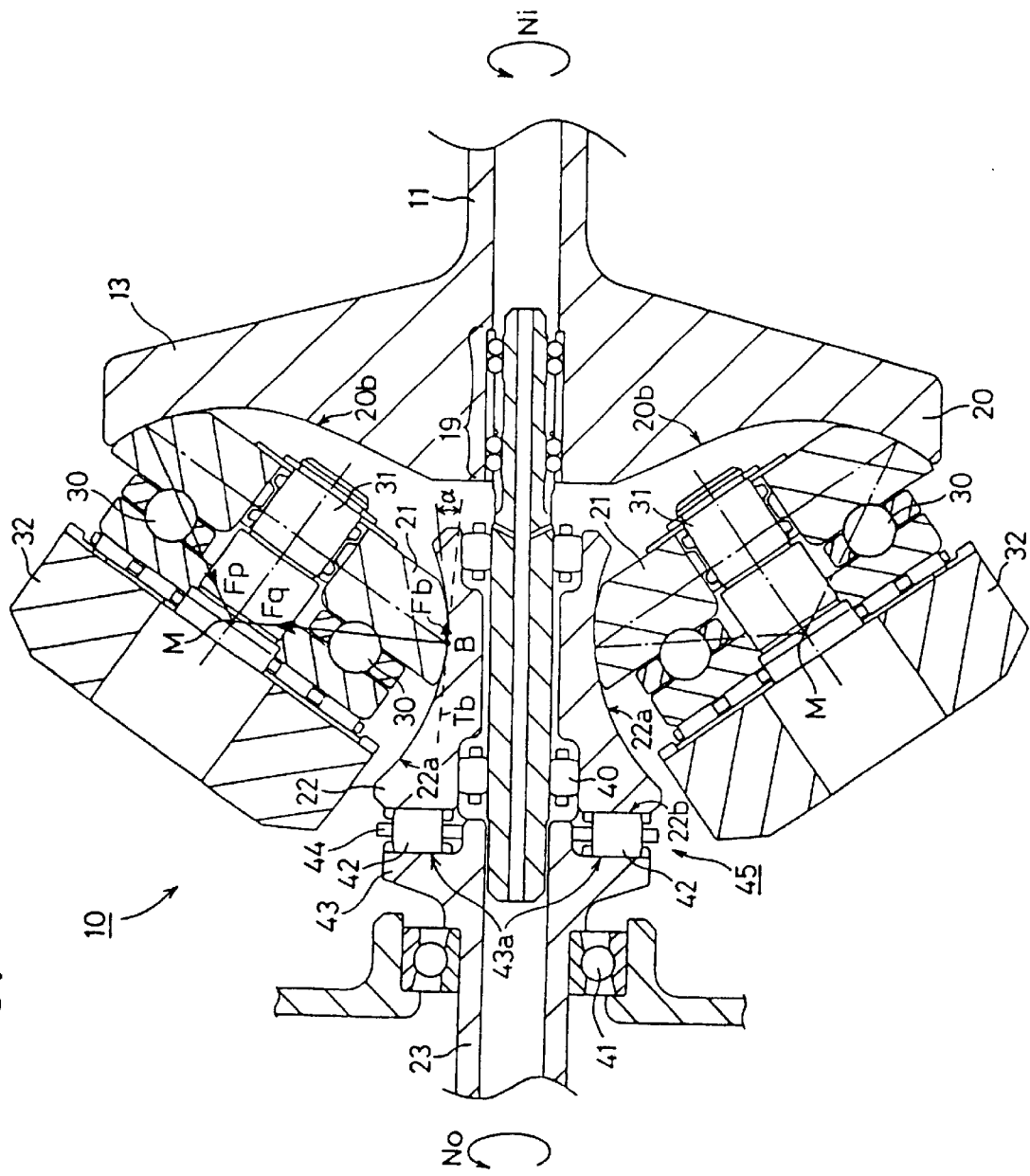
FIG. 5 is a view showing a second embodiment of constant speed drive apparatus 10.

FIG. 5 is a view showing a second embodiment of constant speed drive apparatus 10. A traction speed change mechanism includes an input disk 20, an output disk 22 and transmission rollers 21. This construction is similar to that shown in FIG. 4, and its description will not be repeated.

In this embodiment, an axial pressing force generating mechanism 45 is provided for the output disk 22. The axial pressing force generating mechanism 45 disposed between the output shaft 22 and output disk 23 has a disk-shaped rotating cam 43 rotatable with the output shaft 23. A plurality of wave-like cam surfaces 22b and 43a are formed at equal intervals circumferentially on opposed surfaces of output disk 22 and rotating cam 43, respectively, to vary surface-to-surface spacing continuously. A plurality of cam rollers 42 are disposed between and in contact with the cam surfaces 22b and 43a. The cam rollers 42 lie in troughs of cam surfaces 22b and 43a in a steady state. The output shaft 23 is pressed toward the output disk 22 by a plate spring or the like (not shown), for example, so that the rotating cam 43, cam rollers 42 and output disk 22 are in close contact under a predetermined pressing force.

A retainer 44 is in the form of a disk with a plurality of rectangular retaining bores formed at equal intervals circumferentially thereof. These bores are slightly larger than the outside shape of cam rollers 42. The cam rollers 42 are fitted in these retaining bores, whereby the cam rollers 42, while being allowed to rotate, are maintained in position relative to one another.

Operation of the axial force generating mechanism 45 will be described next. When the output disk 22 and rotating cam 43 rotate steadily in a light load condition, the cam rollers 42 revolve with the output disk 22 and rotating cam 43 while remaining in the troughs of cam surfaces 22b and 43a.

When a positive torque is applied to the output disk 22 subsequently, the output disk 22 tends to rotate ahead of the rotating cam 43. With a relative angular displacement between the output disk 22 and rotating cam 43, the cam rollers 42 tend to roll in a circumferential direction up the slopes of cam surfaces 22b and 43a. This enlarges the spacing between the cam surfaces 22b and 43a, and presses the rotating cam 43 along the axis of rotation, thereby generating an axial force. In this way, an axial force may be generated which is substantially proportional to a torque difference between the output disk 22 and rotating cam 43.

The axial force generated by the axial pressing force generating mechanism 45 acts as a pressing force Fb to press the transmission rollers 21 through the output disk 22. When a large speed change ratio is set with the transmission rollers 21 tilted by a large angle, a tangent Tb at a point of contact B between the surface 22a of output disk 22 and each transmission roller 21 forms a reduced angle α with a direction along the axis of rotation of the disks, i.e. with the pressing force Fb. Thus, the surface 22a of output disk 22 presses each transmission roller 21 at a wedge-thin angle. As a result, a strong effective pressing force Fq is produced by the small pressing force Fb.

Figure 6:
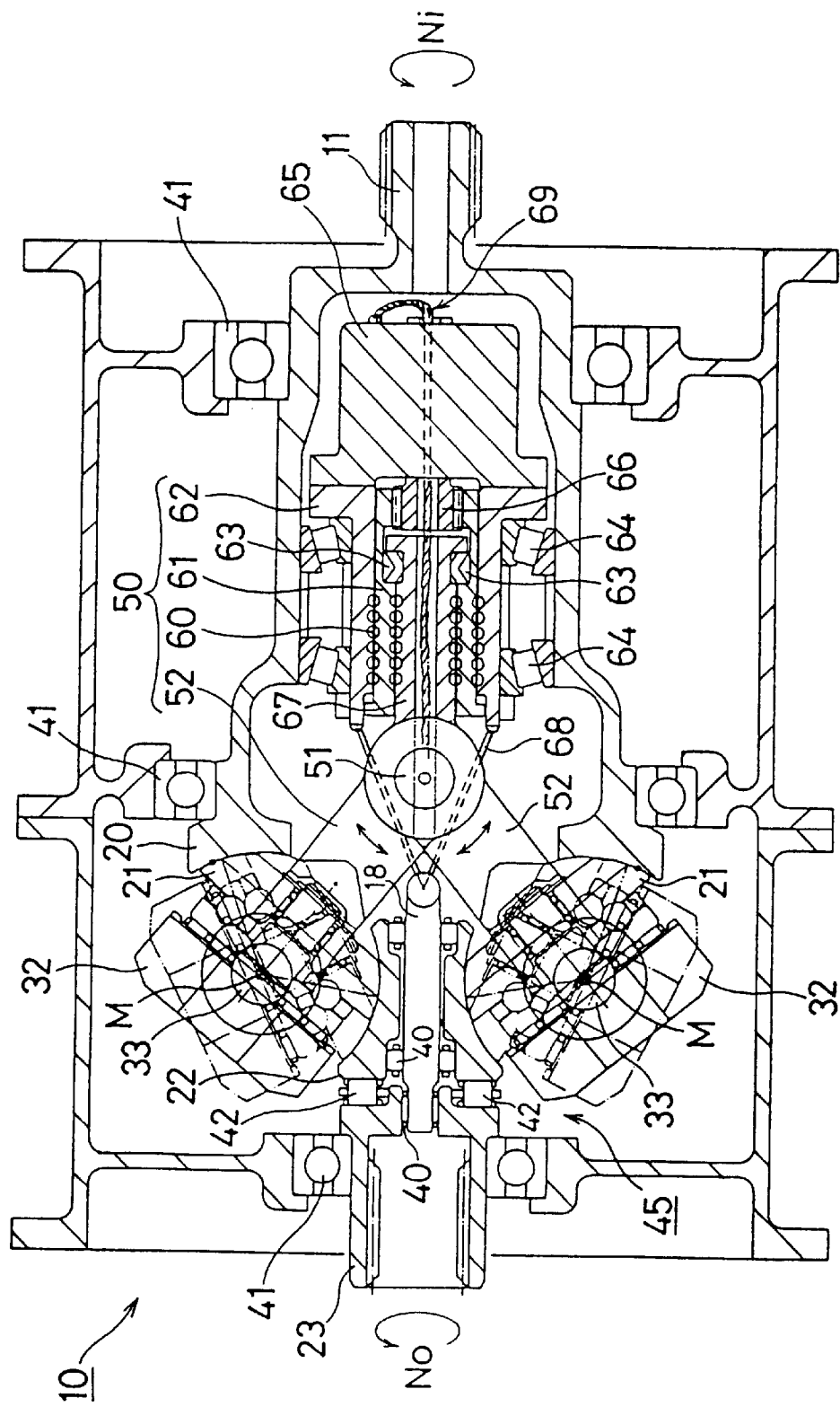
FIG. 6 is a view showing a third embodiment of constant speed drive apparatus 10.

FIG. 6 is a view showing a third embodiment of constant speed drive apparatus 10. A traction speed change mechanism includes an input disk 20, an output disk 22 and transmission rollers 21. This construction is similar to that shown in FIG. 4, and its description will not be repeated. An axial pressing force generating mechanism 45 is provided at the output side as shown in FIG. 5.

In this embodiment, the axial pressing force generating mechanism 12 on the input side shown in FIG. 4 is replaced with a pressing force generating mechanism 50. This mechanism 50 is coupled to the transmission rollers 21 to draw the latter toward the input disk 20, thereby generating a pressing force acting on the transmission rollers 21.

The pressing force generating mechanism 50 includes yoke members 52 each having one end thereof rotatably supporting a tilt axis 33 of transmission roller 21, and the other end supported so as to be pivotable in a plane parallel to a plane (i.e. the plane of FIG. 6) including both of the axis of rotation of the transmission roller 21 and the axis of rotation of the disks, i.e. about an axis perpendicular to these axes of rotation, a support shaft 51 for coaxially supporting upper and lower yoke members 52, and a linear actuator for drawing the support shaft 51 along the axis of rotation of the disks toward the input disk 20.

The tilt axis 33 extends through the tilt center M and projects to opposite sides (front and back of the sheet of FIG. 6). A pair of yoke members 52 support the tilt axis 33 at opposite ends thereof, with the transmission roller 21 disposed between the yoke members 52. The lower transmission roller 21 is similarly supported by a pair of yoke members 52. Where, for example, two, upper and lower transmission rollers 21 are provided, four yoke members 52 are supported by one support shaft 51.

The actuator for drawing the support shaft 51 includes a hollow rod 67 interlocked to the support shaft 51, a ball screw 60 having an inner race 61 and an outer race 62 for applying an axial force to the rod 67, and a motor 65 for generating torque in the inner race 61 around the axis of rotation of the disks.

The input shaft 11 has a forward end thereof defining splines, and a hollow intermediate portion extending from the forward end to the input disk 20. The actuator is disposed in an interior space of the hollow portion. The input shaft 11 and input disk 20 are formed integral with each other, and supported by a housing through an angular bearing 41 to be held against axial displacement.

The rod 67 and inner race 61 are in engagement through a ball bearing disposed in thread grooves thereof, and a rotation of inner race 61 is converted into an axial displacement of rod 67. A preloading spring 63 is disposed between the rod 67 and inner race 61. The inner race 61 and outer race 62 are in engagement through a ball bearing disposed in circumferential grooves thereof. The outer race 62 allows the inner race 61 to rotate about the axis of rotation of the disks, and bears an axial force acting on the inner race 61.

The outer race 62 is supported on an inner wall of the hollow portion of input shaft 11 through roller bearings 64. The input shaft 11 bears an axial force acting on the outer race 62 while allowing rotation of input shaft 11. The motor 65 is in the form of a stepping motor, for example. The motor 65 has a main body thereof fixed to the outer race 62, and a rotary shaft 66 for engaging and driving the inner race 61. A lead wire 69 for supplying power to the motor 65 extends through axial hollows of the motor 65, rotary shaft 66 and rod 67 and outwardly from a position short of output disk 22. A rotation stopper 68 is provided between the outer race 62 and penetrating shaft 18 for stopping rotation of outer race 62. The penetrating shaft 18 is fixed to the housing against rotation. For the motor 65, a hydraulic motor may be used as well as an electric motor. Where a linear motor is used, the ball screw 60 may be dispensed with. The motor 65 and ball screw 60 as a whole may be replaced with a hydraulic piston.

Operation will be described next. When the rotary shaft 66 of motor 65 generates a clockwise torque, for example, the torque is transmitted to the inner race 61 to apply a force through the thread grooves for drawing the rod 67 toward the motor 65. Then, the support shaft 51 draws the distal ends of yoke members 52 which in turn draw the transmission rollers 21 toward the input disk 20, thereby to increase the pressing force of transmission rollers 21.

Conversely, when the rotary shaft 66 of motor 65 generates a counterclockwise torque, a force is applied through the inner race 61 for pressing the rod 67 toward the output disk 22. This reduces the tractive force of yoke members 52 to reduce the pressing force of transmission rollers 21.

Thus, the pressing force generating mechanism 50 for generating the pressing force of transmission rollers 21 may be provided separately from the axis of rotation of the disks. Moreover, the actuator is operable to draw the transmission rollers 21 directly through the yoke members 52, which allows the pressing force of the rollers 21 to be controlled easily and with high precision.

Figure 7:
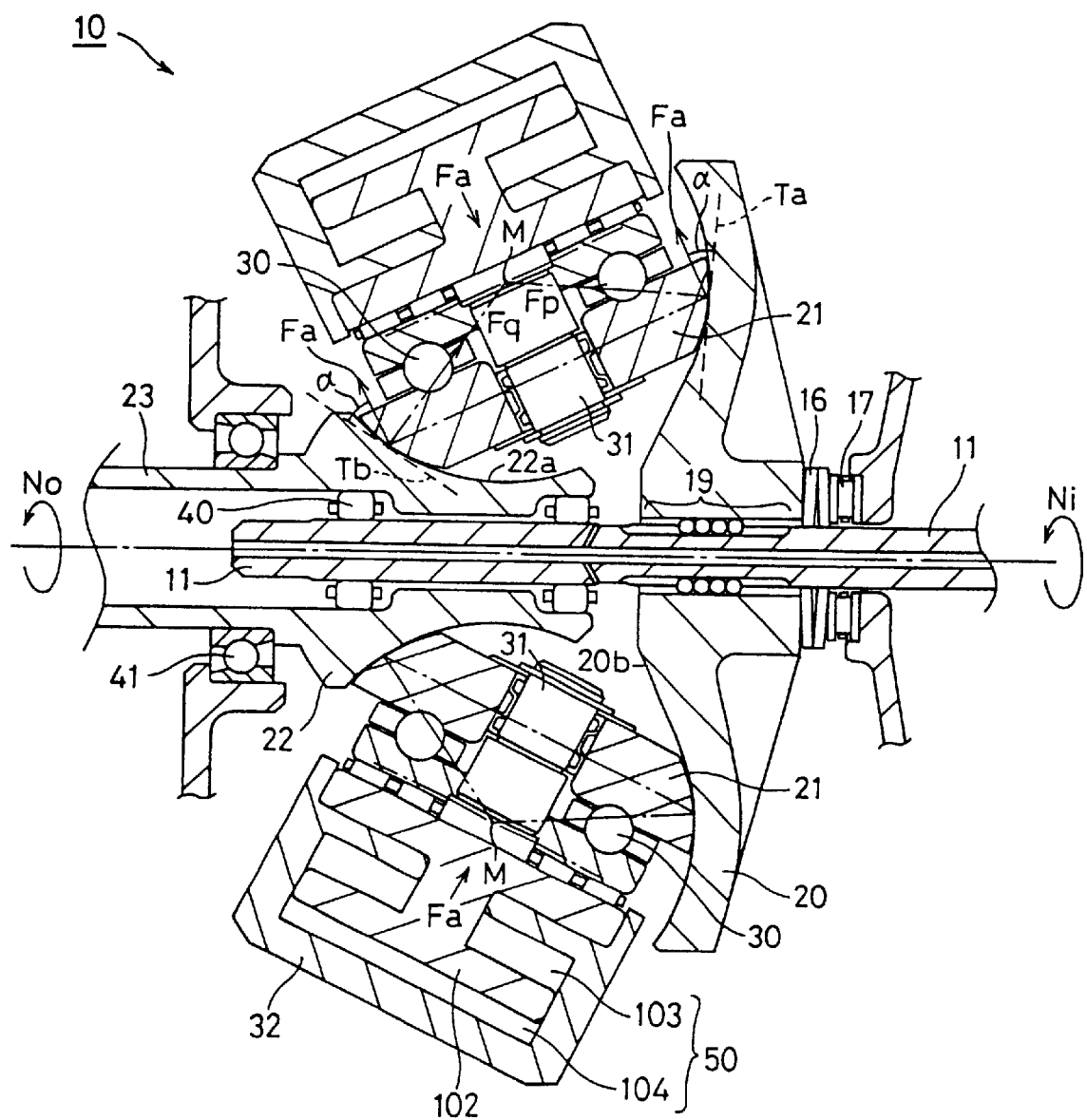
FIG. 7 is a view showing a fourth embodiment of constant speed drive apparatus 10.

FIG. 7 is a view showing a fourth embodiment of constant speed drive apparatus 10. A traction speed change mechanism includes an input disk 20, an output disk 22 and transmission rollers 21. This construction is similar to that shown in FIG. 4, and its description will not be repeated.

In this embodiment, a pressing force generating mechanism 50 is incorporated into each trunnion 32 for generating a pressing force of transmission roller 21. The trunnion 32 rotatably supports the transmission roller 21 through a thrust bearing 30 and a radial bearing 31. The trunnion 32 is in the form of a hydraulic actuator having a piston 102 and a cylinder. By externally controlling the internal pressure of hydraulic chambers 103 and 104 opposed to each other across the piston 102, the piston 102 generates a pressing force Fa acting along the axis of rotation of transmission roller 21 to press the transmission roller 21 toward the disks 20 and 22.

With such a construction, the pressing force Fa may be controlled as desired from outside. Moreover, the pressing force Fa is no longer dependent on the tilt angle of transmission roller 21. A sufficient pressing force Fa corresponding to an input torque may be generated, and effective pressing forces Fp and Fq act in a stable way. As a result, torque transmission is achieved reliably between transmission rollers 21 and disks 20 and 22.

Figure 8:
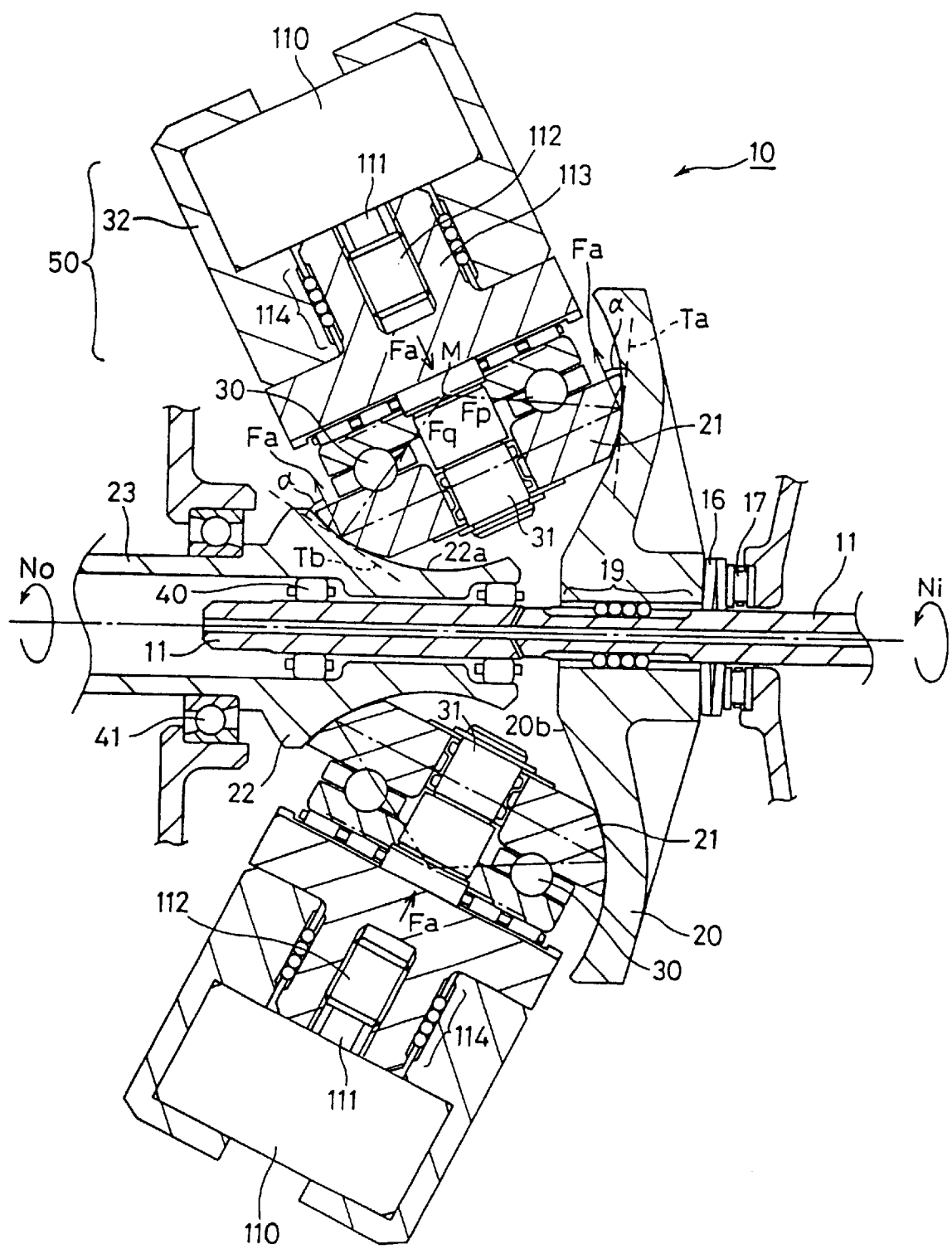
FIG. 8 is a view showing a fifth embodiment of constant speed drive apparatus 10.

FIG. 8 is a view showing a fifth embodiment of constant speed drive apparatus 10. A traction speed change mechanism includes an input disk 20, an output disk 22 and transmission rollers 21. This construction is similar to that shown in FIG. 4, and its description will not be repeated.

In this embodiment, as in FIG. 7, a pressing force generating mechanism 50 is incorporated into each trunnion 32 for generating a pressing force of transmission roller 21. The trunnion 32 is in the form of a linear actuator having a motor 110, a fixed screw 112 and a movable screw 113. The fixed screw 112 formed on an output shaft 111 of motor 110 is meshed with the movable screw 113 supporting the transmission roller 21. When a rotating torque of motor 110 is controlled from outside, the movable screw 113 generates a pressing force Fa acting along the axis of rotation of transmission roller 21 to press the transmission roller 21 toward the disks 20 and 22.

With such a construction, the pressing force Fa may be controlled as desired from outside. Moreover, the pressing force Fa is no longer dependent on the tilt angle of transmission roller 21. A sufficient pressing force Fa corresponding to an input torque may be generated, and effective pressing forces Fp and Fq act in a stable way. As a result, torque transmission is achieved reliably between transmission rollers 21 and disks 20 and 22.

By controlling the operation of pressing force generating mechanisms 50 shown in FIGS. 6 through 8 with the control computer 90 shown in FIG. 1, the pressing force of transmission rollers 21 may be controlled according to engine condition values. Thus, the pressing force may be adjusted as necessary such that the pressing force is increased with an increase in the output torque of the engine and decreased with a decrease in the output torque or in time of engine stalling. In this way, the traction speed change mechanism may be used over an extended period.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A constant speed drive apparatus for an aircraft generator, comprising:
   an input shaft for receiving drive torque from an aircraft engine;
   a traction speed change mechanism having a continuously-variable speed change ratio, said traction speed change mechanism being coupled to said input shaft;
   an output shaft for supplying the aircraft generator with drive torque, said output shaft being arranged to have a rotational speed varied by said traction speed change mechanism; and
   a rotational-frequency controlling mechanism for controlling the speed change ratio of said traction speed change mechanism so as to maintain said output shaft at a predetermined rotational frequency;
   wherein said traction speed change mechanism includes:
   an input disk interlocked to said input shaft;
   an output disk interlocked to said output shaft;
   transmission rollers disposed between said input disk and said output disk;
   yoke members for supporting said transmission rollers such that said transmission rollers are pivotable about an axis perpendicular to an axis of rotation of each of said transmission rollers and an axis of rotation of said input disk; and
   and actuator for pulling said yoke members along the axis of rotation of said input disk so as to draw said transmission rollers toward said input disk to generate a pressing force of said transmission rollers.

2. A constant speed drive apparatus of claim 1, wherein said rotational-frequency controlling mechanism includes:
   a rotational-frequency detecting mechanism for detecting a rotational frequency of said output shaft and generating a detection signal; and a control circuit for controlling the speed change ratio of said traction speed change mechanism based on the detection signal generated by and received from said rotational-frequency detecting mechanism.

3. The constant speed drive apparatus of claim 2, wherein engine status values indicating an operating status of the aircraft engine are inputted to said control circuit, said control circuit being operable to estimate variations in the rotational frequency of said input shaft on the basis of the engine status values to stabilize the rotational frequency of said output shaft.

4. A power generating apparatus for an aircraft comprising:
   said constant speed drive apparatus of claim 1; and
   a generator driven by said output shaft to generate electric power.

5. A traction speed change mechanism comprising:
   an input disk interlocked to a torque input shaft;
   an output disk interlocked to a torque output shaft;
   transmission rollers disposed between said input disk and said output disk;
   yoke members for supporting said transmission rollers such that said transmission rollers are pivotable about an axis perpendicular to an axis of rotation of each of said transmission rollers and an axis of rotation of said input disk; and
   an actuator for pulling said yoke members along the axis of rotation of said input disk so as to draw said transmission rollers toward said input disk to generate a pressing force of the transmission rollers.

6. A constant speed drive apparatus for an aircraft generator, comprising:
   an input shaft for receiving drive torque from an aircraft engine;
   a traction speed change mechanism having a continuously-variable speed change ratio, said traction speed change mechanism being coupled to said input shaft;
   an output shaft for supplying the aircraft generator with drive torque, said output shaft being arranged to have a rotational speed varied by said traction speed change mechanism, said output shaft being directly coupled to the aircraft generator; and
   a rotational-frequency controlling mechanism for controlling the speed change ratio of said traction speed change mechanism so as to maintain said output shaft at a predetermined rotational frequency;
   wherein said traction speed change mechanism is a single cavity type and includes:
     an input disk interlocked to the input shaft;
     an output disk having an outer diameter smaller than an outer diameter of said input disk, said output disk being interlocked to said output shaft;
     transmission rollers disposed between said input disk and said output disk; and
     a pressing force generating mechanism for increasing a pressure of said transmission rollers against said input disk and said output disk, said pressing force generating mechanism including yoke members for supporting said transmission rollers and an actuator connected to said yoke members for pulling said yoke members along an axis of rotation of said input disk and said output disk; and
   wherein the aircraft generator is operable to be driven in a state in which said traction speed change mechanism is accelerated up to a speed higher than a rotational frequency of said input shaft.

7. A constant speed drive apparatus of claim 6, wherein said rotational-frequency controlling mechanism includes:
   a rotational-frequency detecting mechanism for detecting a rotational frequency of said output shaft and generating a detection signal; and
   a control circuit for controlling the speed change ratio of said traction speed change mechanism based on the detection signal generated by and received from said rotational-frequency detecting mechanism.

8. A power generating apparatus for an aircraft comprising:
   said constant speed drive apparatus of claim 6; and
   a generator driven by said output shaft to generate electric power.

9. A constant speed drive apparatus for an aircraft generator, comprising:
   an input shaft for receiving drive torque from an aircraft engine;
   a traction speed change mechanism having a continuously-variable speed change ratio, said traction speed change mechanism being coupled to said input shaft;
   an output shaft for supplying the aircraft generator with drive torque, said output shaft being arranged to have a rotational speed varied by said traction speed change mechanism, said output shaft being directly coupled to a drive shaft of the aircraft generator; and
   a rotational-frequency controlling mechanism for controlling the speed change ratio of said traction speed change mechanism so as to maintain said output shaft at a predetermined rotational frequency, said rotational-frequency controlling mechanism including:
     a rotational-frequency detecting mechanism for detecting a rotational frequency of said output shaft and generating a detection signal; and
     a control circuit for controlling the speed change ratio of said traction speed change mechanism based on the detection signal generated by and received from said rotational-frequency detecting mechanism;
   wherein said traction speed change mechanism is a single cavity type and includes:
     an input disk interlocked to the input shaft;
     an output disk having an outer diameter smaller than an outer diameter of said input disk, said output disk being interlocked to said output shaft;
     transmission rollers disposed between said input disk and said output disk; and
     a pressing force generating mechanism for increasing a pressure of said transmission rollers against said input disk and said output disk; and
   wherein the aircraft generator is operable to be driven in a state in which said traction speed change mechanism is accelerated up to a speed higher than a rotational frequency of said input shaft, and engine status values indicating an operating status of the aircraft engine are inputted to said control circuit, said control circuit being operable to estimate variations in the rotational frequency of said input shaft based on the engine status values to stabilize the rotational frequency of said output shaft.

* * * * *